United States Patent

Richardson et al.

[15] 3,678,880

[45] July 25, 1972

[54] COMBINATION CARD HOLD DOWN AND AUDIBLE INDICATOR-KEYTAPE

[72] Inventors: Stephen M. Richardson, 36 Birch St., Needham, Mass. 02192; Edward P. Grenda, 36 Austin St., Boston, Mass. 02136

[22] Filed: June 16, 1970

[21] Appl. No.: 46,678

[52] U.S. Cl. ................................116/67, 250/209, 250/219, 271/45

[51] Int. Cl. ..........................................................G08b 3/00

[58] Field of Search ................116/67; 250/219 DC, 219 DF, 250/239, 209; 235/61.11; 350/286; 271/64, 45

[56] References Cited

UNITED STATES PATENTS

| | | | |
|---|---|---|---|
| 1,076,691 | 10/1913 | Nicolet | 116/67 |
| 1,468,754 | 9/1923 | Smith | 271/54 X |
| 2,107,618 | 2/1938 | Ochsenbein | 271/45 X |
| 2,411,600 | 11/1946 | Spase | 116/67 UX |
| 3,105,152 | 9/1963 | Nash | 250/239 X |
| 3,361,896 | 1/1968 | Antonio | 250/219 DC X |
| 3,430,033 | 2/1969 | Reed | 235/61.11 |

*Primary Examiner*—Louis J. Capozi
*Attorney*—Fred Jacob and Leo Stanger

[57] ABSTRACT

In a mark sense card reader having a read head with light sensitive elements therein, a card hold down device for maintaining a card passing under the read head in a flat position to prevent distortion, said hold down giving an audible indication when the card has passed the head by contacting the card supporting surface.

4 Claims, 3 Drawing Figures

INVENTORS
EDWARD P. GRENDA
STEPHEN M. RICHARDSON
BY Anthony J. Sarli, Jr.
ATTORNEY

COMBINATION CARD HOLD DOWN AND AUDIBLE INDICATOR-KEYTAPE

BACKGROUND OF THE INVENTION

The present invention relates generally to card readers and more particularly to low speed card readers of the type in which a card, resting on a supporting surface, passes under a reading head, during which time encoded markings on the card are read by the head.

DESCRIPTION OF THE PRIOR ART

Low speed card readers have been proposed in which a card to be read passes beneath an indicia sensitive head where markings on the card are sensed by the head and transformed into electrical representations of data for, for example, an input to a digital data processing device.

In such card readers, particularly those operating at low speeds, there is usually no way for an operator to know when a card has been read and has passed beyond the reading head of the device. Further, means are usually provided in card readers to hold the card in a relatively flat position for reading to prevent distortion of the card while the markings thereon are being sensed.

SUMMARY OF THE INVENTION

The present invention relates to a combination card hold-down and audible indicator in which a tab of flexible material which is attached to a reading head rests upon a card passing under the reading head while the card is being read. After the card has passed, the hold down tab slips off the trailing edge of the card and contacts the card supporting surface producing an audible indication that the card has been read.

OBJECTS

It is an object of the instant invention to provide an improved card hold-down and audible indicator for card readers.

It is a further object of the invention to provide a card hold-down and audible indicator for a mark sense card reader.

The foregoing and other objects and advantages of the instant invention will become apparent from the following description of the preferred embodiment when read in conjunction with the drawings contained herewith.

DESCRIPTION OF THE PREFERRED EMBODIMENT

Figure 1:
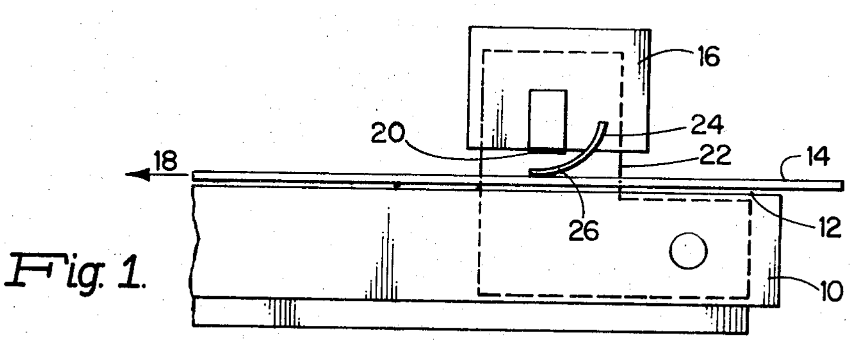
FIG. 1 is a side view showing a card hold-down and audible indicator according to the invention in a position such as to hold a card in place.
Figure 2:
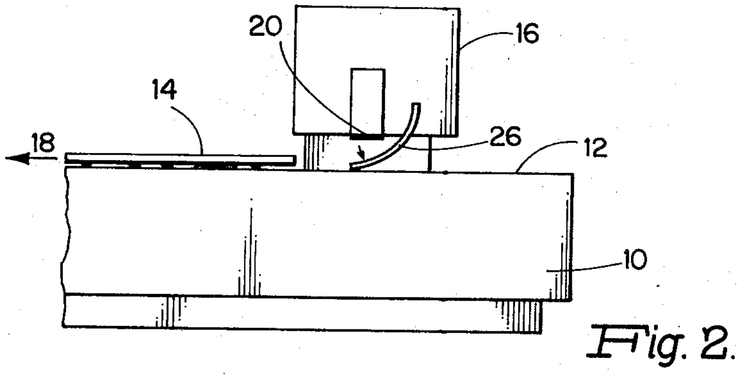
FIG. 2 is a side view of a card reader with a card hold-down and audible indicator after a card has passed the reading station.

FIG. 1 shows a side view of a portion of a low speed card reader incorporating the features of the instant invention. The card reader chassis is indicated generally at 10 and includes a horizontal surface 12 upon which a card 14 rests. The card 14 moves under reading head 16 in the direction shown by arrow 18, whereby indicia on the cards are sensed by sensing elements 20 contained in reading head 16. The reading head 16 may be supported above the reading station surface 12 by means of a bracket 22 shown in dashed lines.

A card reader showing the overall structure of the card reading device is disclosed in application Ser. No. 46,716 filed on even data herewith and assigned to the assignee of the instant invention. To the extent necessary for the understanding of the instant invention, the disclosure of the noted copending application is incorporated herein.

Figure 3:
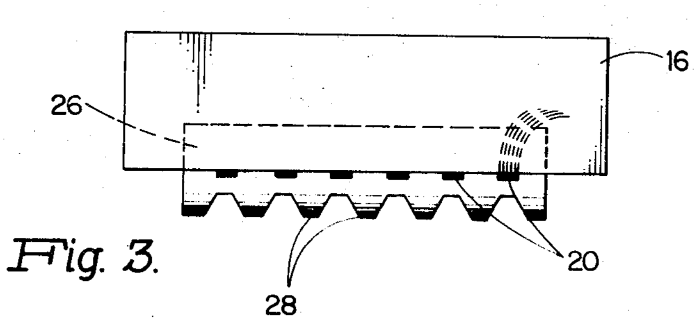
FIG. 3 is a cross-section view of a reading head with a card hold-down and audible indicator attached thereto.

Reading head 16 contains a slot 24 in which is placed and held a card hold down tab 26. The tab 26 is shown in FIG. 3 in front view as having a portion embedded in head 16 and a second portion extending beneath the head. The portion extending beneath the head has a plurality of teeth 28 between which are spaces formed by said teeth. The spaces correspond in location to the light sensitive elements 20. For example, as shown in FIG. 3, there are 7 light sensitive elements 20 and eight teeth in the hold-down tab to allow light to pass from the card to the light sensitive elements even though the tab 26 is flexed into such a position as to be between the sensitive elements and the card.

In operation as a card 14 passes through the card reader, the card rests upon a surface 12 of the leader chassis 10 and it moves in a direction as indicated by arrows 18. The hold-down tab during this operation is flexed slightly, it being a flexible material such as plastic or a thin metallic sheet, and the spaces between the teeth of the tab allow the light sensitive elements 20 to have an unobstructed path to the card. While the tab is in this position, the flexing pressure of the tab tends to hold the card 14 flat against the surface 12 of the card reader chassis to provide a smooth reading surface and prevent distortion in the light sensed by the light sensitive elements 20.

As the card passes beyond the reading station under reading head 16, tab 26 tends to straighten due to its flexibility, and it strikes the surface 12 to produce an audible click to indicate that the card has completely passed the reading station.

The audible click thus produced allows an operator to perform other functions without watching the progress of the card and still know that the card has been completely read.

While in accordance with the provisions of the statutes, there has been illustrated and described the best form of the invention known, it will be apparent to those skilled in the art that changes may be made in the apparatus describe without departing from the spirit of the invention as set forth in the appended claims and that, in some cases, certain features of the invention may be used to advantage without a corresponding use of other features.

Having now described the invention, what is claimed as new and novel and for which it is desired to secure Letters Patent is:

1. In a card reader having a reading head with a plurality of light sensitive elements, and a reading station having a surface across which a card is passed for reading, said reading head located adjacent said reading station surface:

a. a card hold down means attached to said reading head and extending sufficiently to contact said reading surface, b. said hold down means being operative when a card is being read to maintain said card in a flat position at said reading station, c. said hold down means being further operative to provide an audible signal upon passage of a card beyond said reading station wherein said means is a flexible tab and said audible indication is produced by said means striking said surface when a card passes beyond said means.

2. A hold-down means as set forth in claim 1 wherein said tab is rigidly attached to said reading head adjacent said light sensitive elements.

3. A hold-down means as set forth in claim 2 wherein said tab has a plurality of teeth, forming spaces therebetween, said spaces allowing light to pass from said reading station to said light sensitive elements.

4. A hold-down means as set forth in claim 1 wherein said tab is mounted such that one surface thereof rests upon a card being read.

* * * * *